(12) United States Patent
Sakamoto et al.

(10) Patent No.: US 10,076,889 B2
(45) Date of Patent: Sep. 18, 2018

(54) WRAPPED THREE-DIMENSIONAL SHAPED ARTICLE AND PROCESS FOR ITS PRODUCTION

(75) Inventors: Takeaki Sakamoto, Fujisawa (JP); Hirofumi Nitta, Hatano (JP); Hajime Chisaka, Hatano (JP)

(73) Assignee: 3M Innovative Properties Company, St. Paul, MN (US)

( * ) Notice: Subject to any disclaimer, the term of this patent is extended or adjusted under 35 U.S.C. 154(b) by 902 days.

(21) Appl. No.: 13/063,578

(22) PCT Filed: Sep. 11, 2009

(86) PCT No.: PCT/US2009/056665
§ 371 (c)(1),
(2), (4) Date: Jun. 3, 2011

(87) PCT Pub. No.: WO2010/030883
PCT Pub. Date: Mar. 18, 2010

(65) Prior Publication Data
US 2011/0229681 A1    Sep. 22, 2011

(30) Foreign Application Priority Data

Sep. 12, 2008    (JP) ................................. 2008-235424

(51) Int. Cl.
*B32B 3/08*     (2006.01)
*B32B 3/04*     (2006.01)
(Continued)

(52) U.S. Cl.
CPC .................. *B32B 3/08* (2013.01); *B32B 3/04* (2013.01); *B32B 3/28* (2013.01); *B32B 7/12* (2013.01);
(Continued)

(58) Field of Classification Search
CPC .. B32B 7/12; B32B 3/08; B32B 27/40; B32B 27/304; B44C 3/12
(Continued)

(56) References Cited

U.S. PATENT DOCUMENTS 4,169,184 A * 9/1979 Pufahl ........................... 428/337
5,034,077 A * 7/1991 Pata ................................ 156/84
(Continued)

FOREIGN PATENT DOCUMENTS

EP    0587403    3/1994
GB    1 292 467    10/1972
(Continued)

OTHER PUBLICATIONS

Machine translation of JP 07205273.*
(Continued)

*Primary Examiner* — Joanna Pleszczynska
(74) *Attorney, Agent, or Firm* — Harold C. Knecht, III; Philip P. Soo

(57) ABSTRACT

A wrapped shaped article capable of imparting a three-dimensional decoration onto a surface of a base, without producing a molding die for each three-dimensional irregular pattern. An irregular pattern or three-dimensional shape is imparted, without producing a molding die, by placing three-dimensional members on a surface of a base, and attaching a decorative film thereon by vacuum contact bonding.

14 Claims, 5 Drawing Sheets

(51) Int. Cl.
| | |
|---|---|
| *B32B 7/12* | (2006.01) |
| *B32B 27/40* | (2006.01) |
| *B44C 3/12* | (2006.01) |
| *B32B 15/08* | (2006.01) |
| *B32B 15/18* | (2006.01) |
| *B32B 27/08* | (2006.01) |
| *B32B 27/20* | (2006.01) |
| *B32B 27/22* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |
| *B32B 27/42* | (2006.01) |
| *B32B 3/28* | (2006.01) |

(52) U.S. Cl.
CPC ............ *B32B 15/08* (2013.01); *B32B 15/18* (2013.01); *B32B 27/08* (2013.01); *B32B 27/20* (2013.01); *B32B 27/22* (2013.01); *B32B 27/28* (2013.01); *B32B 27/302* (2013.01); *B32B 27/304* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 27/42* (2013.01); *B32B 2255/06* (2013.01); *B32B 2255/10* (2013.01); *B32B 2255/205* (2013.01); *B32B 2255/26* (2013.01); *B32B 2307/306* (2013.01); *B32B 2307/50* (2013.01); *B32B 2307/51* (2013.01); *B32B 2307/712* (2013.01); *B32B 2307/75* (2013.01); *B32B 2451/00* (2013.01); *B32B 2605/00* (2013.01); *B32B 2605/003* (2013.01); *B32B 2605/08* (2013.01); *Y10T 428/23* (2015.01)

(58) Field of Classification Search
USPC .... 428/68, 161, 174, 343, 40.1, 42.1, 542.2, 428/76
See application file for complete search history.

(56) References Cited

U.S. PATENT DOCUMENTS

| | | | |
|---|---|---|---|
| 5,480,688 A | * | 1/1996 | Kaumeyer .................. 428/13 |
| 5,520,988 A | * | 5/1996 | Kuwahara .................. 428/161 |
| 7,195,727 B2 | * | 3/2007 | Sienkiewicz et al. ........ 264/132 |
| 7,507,363 B2 | | 3/2009 | Meyer |
| 2007/0036929 A1 | * | 2/2007 | Baird et al. ................. 428/40.1 |

FOREIGN PATENT DOCUMENTS

| | | |
|---|---|---|
| JP | 52105385 | 8/1977 |
| JP | 54000066 | 1/1979 |
| JP | 05318994 | 12/1993 |
| JP | 7137501 | 5/1995 |
| JP | 7205273 | 8/1995 |
| JP | 9295499 | 11/1997 |
| JP | 2003127225 | 5/2003 |
| JP | 2004042409 | 2/2004 |

OTHER PUBLICATIONS

Machine translation of JP 05318994.*
Evidentiary reference "poly(vinyl chloride) information and properties", PolymerProcessing.com, retrieved Apr. 15, 2015.*
PCT International Search Report for PCT/US2009/056665, dated Nov. 16, 2009.

* cited by examiner

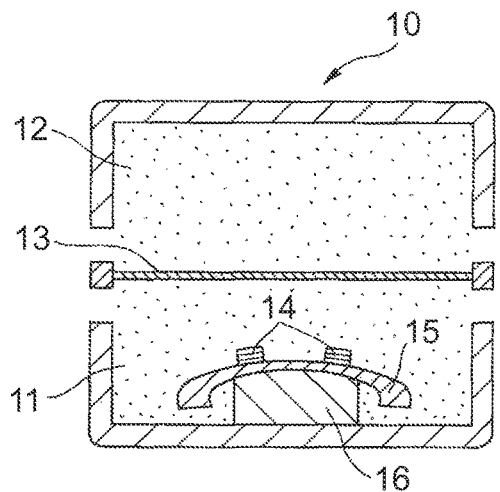
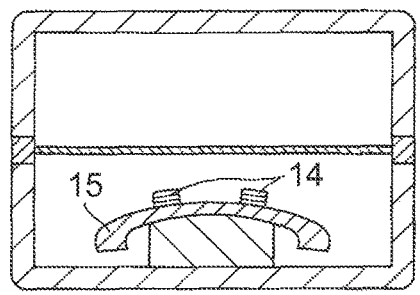
Fig. 2A    Fig. 2B
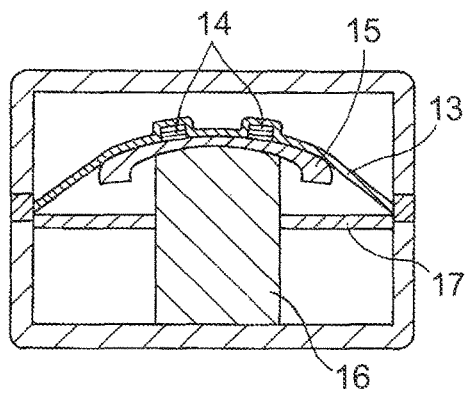
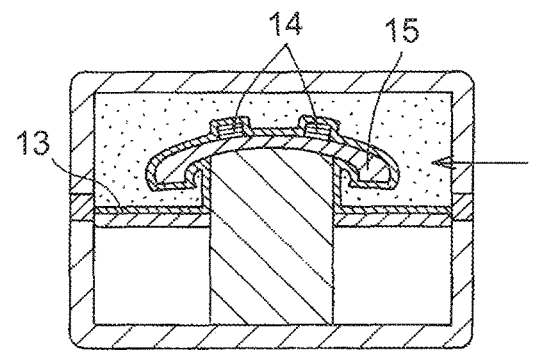
Fig. 2C    Fig. 2D
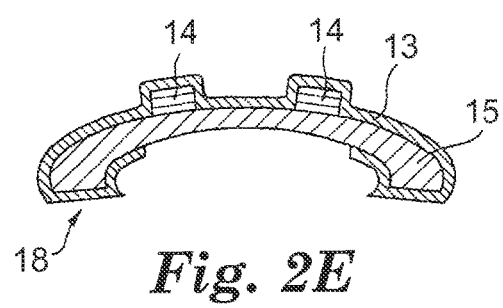
Fig. 2E

WRAPPED THREE-DIMENSIONAL SHAPED ARTICLE AND PROCESS FOR ITS PRODUCTION

CROSS REFERENCE TO RELATED APPLICATIONS

This application is a national stage filing under 35 U.S.C. 371 of PCT/US2009/056665, filed Sep. 11, 2009, which claims priority to JP Application No. 2008-235424, filed Sep. 12, 2008, the disclosure of which is incorporated by reference in its/their entirety herein.

TECHNICAL FIELD

The present invention relates to a wrapped shaped article, and more specifically it relates to a wrapped three-dimensional shaped article having a three-dimensional decoration on a base surface, and to a process for its production.

BACKGROUND ART

Decorative films are used as wrappings on the surfaces of molded parts such as interior and exterior parts of automobiles or motorcycles, such as side cowls or center cowls, to form decorative three-dimensional molded parts. In recent years it has become common to form irregular patterns on such three-dimensional molded part surfaces in order to provide a decorative design with a three-dimensional effect. Formation of such irregular patterns on the surfaces of three-dimensional molded parts usually requires formation of irregularities on the surface of the actual base of the molded part, and therefore a molding die has been necessary for each irregular pattern.

Methods for forming three-dimensional designs on molded parts, on the other hand, include methods using films or sheets with irregularities on their surfaces, and the following publications relate to such methods.

Japanese Unexamined Patent Publication HEI No. 9-295499, published Nov. 18, 1997, describes a decorative body comprising a base and a design pattern of a desired form composed of a synthetic resin sheet formed in a fixed manner on the top of the base, and a surface material composed of a fine irregular design-bearing transparent synthetic resin sheet, formed on the design pattern in such a manner that spaces are present between the sheet and the design pattern by the shapes of the upward bulges, and with the edges fixed onto the edges of the design pattern.

Japanese Unexamined Patent Publication No. 2003-127225, published May 8, 2003, describes a process for production of a three-dimensional decorative body comprising: a melt extruded thermoplastic resin being filled into a mold material with a plurality of recesses, and the raised design sections composed of the resin filled into the recesses of the mold material being transferred to the surface of a base sheet of the heated thermoplastic resin, and fused therewith.

Japanese Unexamined Patent Publication No. 2004-42409, published Feb. 12, 2004, describes a process for production of an insert sheet, wherein a laminated body obtained by forming at least a surface protective layer composed of an uncured ionizing radiation-curable resin on one side of a transparent or semi-transparent base sheet, and a molding die having fine irregularities on the surface, are used to mold the surface protective layer side of the laminated body by heated pressing, after which the side is irradiated with ionizing radiation to harden the surface protective layer, thus providing at least a decorating layer with a design pattern on the base sheet side of the laminated body.

SUMMARY OF THE INVENTION

As mentioned above, three-dimensional formation of an irregular pattern on the surface of a three-dimensional structure such as a molded part by conventional processes has required that the insert molding die, etc. has to be formed for each design, in order to produce the irregularities in the material of the molded part. Because of the high cost of producing dies, the time and cost required for different types of products are burdensome. Moreover, the methods for imparting three-dimensional shapes to molded parts by using three-dimensional decorative films or sheets are not always a simple method, and molding patterns must be formed for each design, making it difficult to alter the design.

The present invention is to provide a wrapped shaped article which does not require a different molding die for each design, which allows three-dimensional decorations to be imparted to shaped part surfaces by a simple method, and which facilitates design variation, as well as to provide a process for its production.

According to one aspect of the invention, there is provided a wrapped three-dimensional shaped article that comprises a base having a first major surface, three-dimensional members partially bonded to the first major surface of the base and a decorative film attached to cover at least a portion of an exposed surface of the base including the three-dimensional members.

According to another aspect of the invention, there is provided a process for production of a wrapped three-dimensional shaped article comprising: preparing a base, partially bonding three-dimensional members onto the first major surface of the base, and attaching a decorative film by vacuum contact bonding.

The wrapped three-dimensional shaped article according to the one aspect of the present invention is provided as a wrapped three-dimensional shaped article having a three-dimensional decoration on the base surface by a simple method, without requiring a different molding die for each design. It is also possible to easily change the design of the three-dimensional decoration by changing the positions or shapes of the three-dimensional members.

The process for production of a wrapped three-dimensional shaped article according to the another aspect of the present invention can easily produce a wrapped three-dimensional shaped article according to one aspect of the present invention as described above by using the vacuum contact bonding.

BRIEF DESCRIPTION OF THE DRAWINGS

FIGS. 2A-2E show a summary of the steps for heated vacuum contact bonding according to the process of one embodiment of the present invention.

BEST MODE FOR CARRYING OUT THE INVENTION

Representative embodiments of the present invention will now be disclosed for illustration, with the implicit understanding that the present invention is not limited to these embodiments.

The wrapped shaped article according to the present disclosure comprises a base, three-dimensional members partially bonded to the first major surface of the base and a decorative film attached to cover at least a part of an exposed surface of the base including the three-dimensional members. Shaped articles with three-dimensional decorations on their base surfaces can be obtained, without the need to create a base material molding die for each product. Such a construction allows three-dimensional decorative designs to be easily changed.

The expressions "partially bonding" or "partially bonded" are used herein to mean bonding or bonded to a part of the surface of an adherend.

Figure 1A:
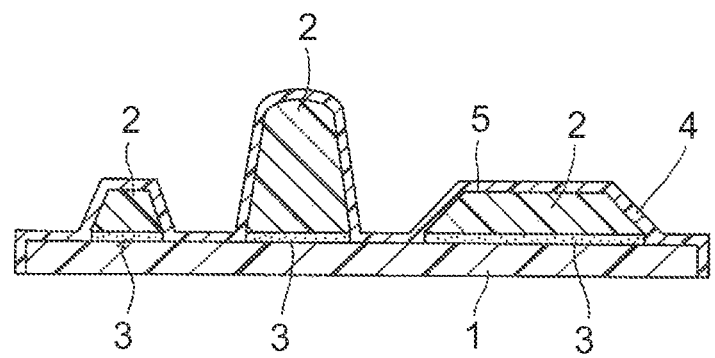
FIGS. 1A and 1B show schematic cross-sectional views of exemplary wrapped three-dimensional shaped articles according to the present invention.
Figure 1B:
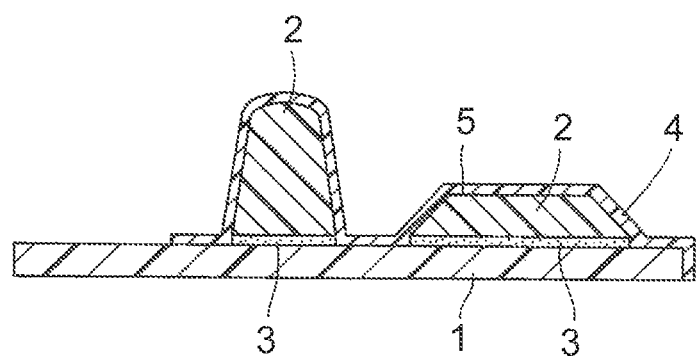

FIGS 1A and 1B show partial cross-sectional views of exemplary wrapped three-dimensional shaped articles according to the present disclosure. The three-dimensional members 2 are placed and bonded onto the surface of the base 1, and the decorative film 4 is attached (wrapped) to all (FIG. 1A) or part (FIG. 1B) of the exposed surfaces of the three-dimensional members and base. In FIGS. 1A, 1B, the three-dimensional members 2 are bonded to the base 1 by an adhesive layer 3. Also shown is optional adhesive layer 5.

The material for the base is not particularly restricted, but one with heat resistance at the heating temperature during vacuum contact bonding, is suited. As examples there may be mentioned steel sheets such as iron sheets, melamine-coated iron sheets, stainless steel sheets; thermoplastic resins including polyesters such as polyethylene terephthalate (PET), polybutylene terephthalate (PBT) and polyethylene naphthalate (PEN), polyvinyl chloride, polycarbonates, acrylonitrile/butadiene/styrene (ABS), acrylonitrile/ethylene-propylene-diene/styrene (AES), polyurethanes, poly(meth)acrylates such as polymethyl methacrylate, polyolefins such as polyethylene and polypropylene, and nylon, etc.; or thermosetting resins including melamine resins, urea resins and phenol resins, etc.

There are no particular restrictions on the form of the base, and the base may be in the form of a curved or flat block or sheet, for example, obtained by a known molding method such as injection molding, RIM molding, extrusion molding or laminate molding, or by further working such as cutting or punching.

The dimensions of the base are not particularly restricted, so long as the base does not interfere with working. For example, the dimensions may be a thickness of from several millimeters to several centimeters, and a length and width of from several centimeters to several meters each. Working to a length and width of at least about 1 meter each can be accomplished using a commercially available vacuum contact bonding machine, but vacuum contact bonding machines with even larger dimensions can also be produced.

The three-dimensional members are used mainly to impart a three-dimensional decoration onto the surface of the base, but the three-dimensional members may also be used to add a three-dimensional shape to the base. Specifically, three-dimensional members may be bonded to the surface of the base to impart decoration of irregular patterns on the surface of the base.

The material of the three-dimensional members may be any material, either the same as or different from the material of the base. Instead of being the same material as the base, it may be a material used as a pressure-sensitive adhesive film comprising a pressure-sensitive adhesive layer on a base film, or as a pressure-sensitive adhesive tape which has a narrower thickness than a pressure-sensitive adhesive film, as described hereunder.

As base films, there may be mentioned thermoplastic resins including polyesters such as polyethylene terephthalate (PET), polybutylene terephthalate (PBT) and polyethylene naphthalate (PEN), polyvinyl chloride, polycarbonates, acrylonitrile/butadiene/styrene (ABS), acrylonitrile/ethylene-propylene-diene/styrene (AES), polyurethanes, poly(meth)acrylates such as polymethyl methacrylate, polyolefins such as polyethylene and polypropylene, and nylon, etc.; or thermosetting resins including melamine resins, urea resins and phenol resins, etc. Polyvinyl chloride and polyurethanes may be used.

There are no particular restrictions on the dimensions of the three-dimensional members, and the dimensions of the three-dimensional members may be selected based on the decorative design, so long as the three-dimensional members can bond to the base surface and allow wrapping of the film by vacuum contact bonding. As shown in FIGS. 1A, 1B, there are no limitations to the size, shape and number of three-dimensional members 2 placed on the surface of the base 1. Different combinations of three-dimensional members 2 can provide a variety of three-dimensional decorative designs.

The irregular patterns may be imparted to the base surface by using a film or pressure-sensitive adhesive film that has been punched, etc., to form pattern elements. The thickness of a film used as a three-dimensional member may be a sufficient thickness to be visible as a three-dimensional decoration when the three-dimensional members are covered with the decorative film, and for example, the thickness of a film may be approximately 0.04 mm or greater. According to another embodiment, the thickness of the film may be approximately 0.06 mm or greater, and according to yet another embodiment, the thickness of a film may be approximately 0.1 mm or greater, in which case a more prominent three-dimensional effect is easily obtained. For three-dimensional members with steep inclines at the edges, a three-dimensional effect can be achieved more easily even with thinner members.

If the thickness of the three-dimensional members is too great, the wrapped decorative film may become raised at the inclines at the edges of the three-dimensional members. The thicknesses of the three-dimensional members may therefore be no greater than approximately 2 mm, or no greater than approximately 1 mm.

However, if the inclines at the edges of the three-dimensional members are not steep, it will be possible to prevent raising of the decorative film at the edges even if the thickness or height of the film or of the three-dimensional members other than the film is approximately 1.0 mm, or greater, or even approximately 2.0 mm or greater. Thus, if the edges are chamfered or the cross-sectional shapes of the edges are rounded into curves, it will be possible to use higher three-dimensional members and thus achieve a decoration with a greater three-dimensional effect (see FIGS. 1A, 1B). If the decorative film is attached by vacuum contact bonding, incidentally, the decorative film will satisfactorily follow the shapes of the three-dimensional members as the film covers the members, thus more effectively preventing the edge sections from being raised.

The flat dimensions of the three-dimensional members may be selected as desired according to the design. For example, three-dimensional members having widths or lengths of from approximately 0.1 mm to several tens of centimeters may be selected.

The three-dimensional members may, according to one aspect, be formed by packing a material that is the same as or different from the material of the base into hollow sections inside the sheet that have been deformed into semi-spherical shapes. For example, a polyurethane film may be shaped into semi-circular spherical shapes and a resin such as an acrylic or nylon resin may be packed into the hollow sections.

There are no particular restrictions on the pressure-sensitive adhesive used to bond the three-dimensional members to the base (hereinafter referred to as "first pressure-sensitive adhesive"). The pressure-sensitive adhesive may be used to manually bond the three-dimensional members to the base, as this will facilitate reattachment. Specifically adhesives that can hold the three-dimensional members on the base, that do not slip under the contact bonding force applied during vacuum contact bonding, and that do not degenerate or seep during high-temperature or long-term use, are suitable, and examples of such adhesives include rubber materials such as natural rubber, SBR and butyl rubber, and acrylic-based, silicone-based, diene-based and polyethylene-based materials, and the pressure-sensitive adhesive may be used in liquid form such as a solvent or emulsion type. Acrylic pressure-sensitive adhesives may be used from the viewpoint of pressure-sensitive adhesive force for adhesion onto olefin-based resins such as polypropylene resins.

The thickness of the first pressure-sensitive adhesive layer is not particularly restricted, but the thickness of the first pressure-sensitive adhesive layer may be no greater than about 200 micrometers, or no greater than about 100 micrometers, in order to avoid squeeze-out from between the base and three-dimensional members after contact bonding of the decorative film. On the other hand, the thickness of the first pressure-sensitive adhesive layer may be at least about 5 micrometers, or at least about 10 micrometers, or at least about 20 micrometers in order to prevent slipping of the three-dimensional members from the base during contact bonding of the decorative film.

The method of bonding the three-dimensional members to the base may employ other fixing means instead of the aforementioned methods utilizing pressure-sensitive adhesives, which means may be used alone or in combination with pressure-sensitive adhesives. For example, in order to aid fixing of the three-dimensional members to the base there may optionally be employed means for providing the base with an irregular shape so that the base and three-dimensional members firmly fit together.

With the wrapped three-dimensional shaped article according to the present disclosure, it is possible to accomplish wrapping of at least part of the exposed surface of the three-dimensional members-bonded base with a decorative film, so that a wrapped shaped article can be obtained based on a base provided with a three-dimensional decoration by three-dimensional members on the base surface. Since the three-dimensional members are integrally held to the base in the wrapped shaped article, the wrapped shaped article is similar to one in which the base itself has a three-dimensional surface form. It is therefore possible to obtain a shaped article having the desired irregular patterns on the surface, merely by changing the three-dimensional members and their positions, without producing a different molding die for each irregular surface patterns. The main objects of the decorative film which wraps the base surface are for decoration and/or protection of the base. Through the present disclosure, the term "decorative film" includes, for example, transparent wrapping films that serve primarily to protect the base surface.

When the vacuum contact bonding described hereunder is used as the wrapping method, it will be possible to accomplish satisfactory coating that follows the shapes of the three-dimensional members, and therefore the inclined sections at the edges of the three-dimensional members will not be easily raised, and a satisfactory integrated effect will be obtained between the base and three-dimensional members, and the decorative film. As a result, a satisfactory three-dimensional decorative appearance will be obtained, similar to a product obtained by forming irregularities in the base itself.

Partial attachment of the decorative film to the adherend can be accomplished by pre-working the decorative film, by cutting or the like, into desired shapes that partially cover the adherend after attachment. When the decorative film is to be partially attached by vacuum contact bonding, a pressure-sensitive adhesive layer having the desired shape (a pressure-sensitive adhesive that bonds the three-dimensional members and/or base with the decorative film, hereinafter also referred to as "second pressure-sensitive adhesive") may be provided only on the attachment surfaces of the three-dimensional members and/or the base, or the decorative film, and the sections of the decorative film other than those in the desired shape are removed by cutting or the like after the vacuum contact bonding, and/or a vacuum contact bonding machine may be used that can hold part of the three-dimensional members and/or base in the vacuum chamber while maintaining the pressure difference with respect to the machine exterior, etc.

Incidentally, the entire exposed surface of the base to which the three-dimensional members are bonded may be completely wrapped with the decorative film. (This condition will also be referred to as "fully wrapped" throughout the present specification.) In this case, the base surface is completely covered, and therefore the base-protecting effect is increased and the edges of the decorative films are covered up to the edges of the base, thus rendering the decorative film resistant to peeling.

With either wrapping or full wrapping, the decorative film may cover up to a portion of the back side of the base as shown in FIG. 2E, in order to help prevent peeling of the decorative film.

There are no particular restrictions on the material of the decorative film, but when wrapping is accomplished by vacuum contact bonding, a material that is heat resistant at the heating temperature used during vacuum contact bonding, may be used. As examples there may be mentioned thermoplastic resins including polyesters such as polyethylene terephthalate (PET), polybutylene terephthalate (PBT) and polyethylene naphthalate (PEN), polyvinyl chloride (PVC), polycarbonates (PC), acrylonitrile/butadiene/styrene (ABS), acrylonitrile/ethylene-propylene-diene/styrene (AES), polyurethanes, poly(meth)acrylates such as polymethyl methacrylate, polyolefins such as polyethylene and polypropylene, and nylon. Among these, polyvinyl chloride, polyurethanes, poly(meth)acrylates, polypropylene, polycarbonates, ABS and AES have excellent weather resistance, as well as elongation during heating and attachment to adherends. Polyvinyl chloride, polyurethanes, poly(meth) acrylates and polypropylene are particularly suitable.

The decorative film will normally comprise a single layer or multiple layers of base films shaped by cast molding, extrusion molding or the like, and the decorative film may also optionally contain a printed layer, metal vapor deposition layer or pressure-sensitive adhesive layer on the base film.

The base film of the decorative film may be a film laminate formed of the same or different materials, for the purpose of achieving improved surface protection, weather resistance, strength or aesthetic quality. When the laminate films are comprised of different material films, the films may have similar elastic modulus, elongation percentages and Tg and Tm values, in order to help prevent interlayer peeling between the films during contact bonding.

The decorative film may also contain a printed layer as a monolayer or multilayer on the adherend surface and/or on the opposite surface, for decoration. A known method such as screen printing, gravure printing, offset printing, inkjet printing or electrostatic coating may be used for the printing. Screen printing may be used from the viewpoint of allowing coating of various commercially available weather-resistant inks The printed layer is suitably situated between the base film of the decorative film and the second pressure-sensitive adhesive, so that no protective layer will be used on the printed layer and crocking due to rubbing will be reduced.

For an improved decorative property, the decorative film may be provided with a monolayer or multiple layers formed by vapor deposition of one or more metal films of chromium, aluminum, titanium, indium, tin, nickel, stainless steel, silver, gold, copper, titanium or the like, and/or finishing by application of a coating containing powdered metal fine particles, in order to impart a dark/light and/or other pattern on the adhesive side and/or the side opposite the adhesive side of the decorative film. Adhesion of an indium vapor deposition film or powdered metal fine particles is suitable to help prevent whitening or splitting of the metal film during heated contact bonding of the decorative film. Adhesion of powdered metal may be accomplished using a known adhesive and coating technique. As for the printed layer, a metal vapor deposition layer or powdered fine particle layer is suitably also placed between the decorative film and second pressure-sensitive adhesive to reduce crocking by rubbing and the like.

The light transmittance of the metal vapor deposition layer and powdered metal fine particle-containing layer in the decorative film may be within a wide range depending on the degree of freedom of design, and specifically it is 0.1-99.9% at a wavelength of 550 nm.

The thicknesses of the metal vapor deposition layer and powdered metal fine particle-containing layer are not particularly restricted, and they may be thicknesses selected according to the pattern and/or light transmittance intended for the design, such as from less than a few nanometers to several tens of nanometers, for example.

The decorative film may also contain additives such as plasticizers, antioxidants, ultraviolet absorbers, pigments, and fillers, or the like.

The thickness of the decorative film is not particularly restricted, but a thickness of no greater than approximately 200 micrometers will help prevent the film at the edge sections of the contact bonded three-dimensional member from becoming raised. A thickness of no greater than approximately 100 micrometers will further improve the ability of the film to follow the shapes of the three-dimensional members during vacuum contact bonding. From the viewpoint of base protection, on the other hand, the minimum thickness of the decorative film may be approximately 50 micrometers or more, or approximately 80 micrometers or more, in order to ensure consistent strength.

The decorative film may comprise a second pressure-sensitive adhesive on the adhesive side, for adhesion with the three-dimensional members and/or base. The second pressure-sensitive adhesive may be any of those mentioned above for the first pressure-sensitive adhesive, and the second pressure-sensitive adhesive may even be identical to the first pressure-sensitive adhesive.

Formation of the second pressure-sensitive adhesive on the decorative film may be accomplished by using any method such as coating or spraying, but typically the formation will be accomplished by coating a pressure-sensitive adhesive coating solution and drying the solution. The thickness of the second pressure-sensitive adhesive layer is not particularly limited, so long as it does not result in peeling or curling of the decorative film after contact bonding, or seep-out under high temperature. For example, the thickness of the second pressure-sensitive adhesive layer may be approximately 10 micrometers-approximately 50 micrometers, or according to another embodiment, approximately 20 micrometers-approximately 40 micrometers.

When the base is an olefin resin such as polyethylene or polypropylene which has low surface free energy and poor adhesion, the second pressure-sensitive adhesive may contain an adhesion agent such as a tackifier to promote adhesion.

In order to raise the surface free energy of the bonding surfaces consisting of the base and three-dimensional members to increase wettability and enhance the pressure-sensitive adhesive force, the base and/or three-dimensional members may be subjected to plasma treatment or corona discharge treatment. The adhesive force can be effectively improved, when a thermoplastic resin, and especially an olefin-based resin such as polyethylene or polypropylene mentioned in the present disclosure, is used for the base and/or three-dimensional members. In particular, corona discharge treatment can accomplish treatment of large-sized adherends at atmospheric pressure.

In order to ensure that no air remains between the adherend and decorative film after contact bonding of the decorative film, a plurality of connected grooves may be provided on all or a portion of the second pressure-sensitive adhesive layer, for removal of bubbles. The depths and widths of the grooves are not particularly restricted, so long as the grooves allow removal of bubbles, and the depths and widths of the grooves may be up to several millimeters in size. Although the maximum depth and width of the grooves are not restricted, the maximum depth and width of the grooves may be no larger than approximately 30 micrometers, or no larger than approximately 10 micrometers, so that the shapes of the grooves will not be visible after attachment of the decorative film. The minimum depth and width of the grooves are not particularly restricted so long as bubbles can be removed, but for smooth bubble removal, the minimum depth and width of the grooves may be at least approximately 1 micrometer, or at least approximately 5 micrometers in size. The shapes of the grooves formed in the second pressure-sensitive adhesive layer at the adhesion side of the decorative film are also not limited and may be linear, curved or broken. More effective removal of bubbles can be achieved, if each groove extends to the edge of the film.

Contact bonding of the film to the surface with the three-dimensional shape may be carried out at room temperature, but for sufficient attachment it is suitable to heat the film to soften and expand the film for contact bonding.

Heated contact bonding of the decorative film to the adherend may be accomplished by heating to a temperature that allows the decorative film to exhibit sufficient extensibility for contact bonding with the adherend. The heating temperature is a temperature that can produce the desired elongation percentage depending on the Tg of the resin and it is not particularly restricted; however, for a polyurethane or polyvinyl chloride, for example, the heating temperature may be at least approximately 60° C., or approximately 80° C. to approximately 140° C., or approximately 100° C. to approximately 130° C. An interior part of an automobile, for example, have heat resistance at approximately 80° C. under severe conditions, and heat resistance at approximately 100° C. to approximately 110° C. under even more severe conditions. It is therefore suitable to use a decorative film that can exhibit heat resistance at such temperatures, and to select appropriate heating and vacuum contact bonding conditions.

The degree of heat resistance of the decorative film will depend on the purpose of use, but for most cases the degree of heat resistance of the decorative film may be approximately 60° C. or higher, or approximately 80° C. or higher. For exterior or interior use in an automobile or motorcycle, for example, where the maximum interior temperature is approximately 80° C., or approximately 100° C., the heat resistance may be approximately 100° C. to approximately 110° C. or even higher. The heat resistance may even be approximately 140° C. to approximately 160° C. or higher.

When vacuum contact bonding is used to attach the decorative film to the base, the vacuum contact bonding onto the adherend will usually be carried out by heating. Since irregularities are provided by the three-dimensional members on the base surface according to the present disclosure, the decorative film suitably has extensibility. When the base itself also has a three-dimensional shape, the decorative film stretches by attachment to the adherend surface during the vacuum contact bonding. Residual stress is present at the stretched sections, but the film may be one that stretches to approximately 150% or more or even approximately 200% or more in terms of the film dimensions with respect to approximately 100% as the dimensions of the film before stretching, although the degree of stretching during bonding (at the aforementioned heating temperature) will depend on the shape of the adherend, so that the pressure-sensitive adhesive force is maintained even when residual stress is present in the decorative film of the present disclosure, even when heated at high temperature and even when cooled to ordinary temperature.

An embodiment of a process for production of a wrapped shaped article according to the present disclosure will now be explained. For this production process, first a base is prepared and three-dimensional members are partially bonded to the surface of the base. The base and three-dimensional members used are those described above. When the three-dimensional members are the pressure-sensitive adhesive film comprising pressure-sensitive adhesive layer, the prescribed number of three-dimensional members having prescribed shapes are bonded and fixed by their pressure-sensitive adhesive layers at prescribed locations matching the design to be formed. The three-dimensional members are used to match a plurality of individual patterns prepared in advance, and optimal patterns may be selected and combined. There are no particular restrictions on the bonding and fixing method, and the attachment may be accomplished manually.

Vacuum contact bonding is then used to attach the decorative film to cover the exposed surface of the base including the three-dimensional members. The heated vacuum contact bonding process will now be explained with reference to the schematics process drawing of FIGS. 2A-2E. As shown in FIG. 2A, a typical vacuum contact bonding machine has two vacuum chambers 11, 12 above and below, and is provided with a jig to set the film which is to cover the adherend, between the upper and lower vacuum chambers. A vertically movable platform 16 is mounted on the lower vacuum chamber, and the adherend is set on the platform 16.

As shown in FIG. 2A, first the lower vacuum chamber 11 and the upper vacuum chamber 12 of the vacuum contact bonding machine 10 are opened to atmospheric pressure, and the decorative film 13 is set between the upper and lower vacuum chambers. A base (adherend) 15 having three-dimensional members (adherends) 14 attached with a pressure-sensitive adhesive is set on the platform 16 in the lower vacuum chamber 11.

Next, as shown in FIG. 2B, the lower vacuum chamber 11 and upper vacuum chamber 12 are closed, and both are evacuated to create an interior vacuum (for example, 1 MPa). Then, as shown in FIG. 2C, the decorative film 13 is heated while pushing the base 15 into the upper vacuum chamber 12 by the platform 16. The heating is accomplished with, for example, a lamp heater built into the ceiling of the upper vacuum chamber. The decorative film 13 is stretched by being pushed against the base (adherend) 15 with the three-dimensional members (adherends) 14 on its surface. During this time, the lower vacuum chamber 11 and upper vacuum chamber 12 are partitioned by a partition plate 17. Next, as shown in FIG. 2D, the interior of the upper vacuum chamber 12 is pressurized to a suitable pressure (for example, between 2 MPa and atmospheric pressure) while heating the decorative film 13. The decorative film 13 becomes bonded to the exposed surface of the base (adherend) 15 with the three-dimensional members (adherends) 14 on its surface, whereby the decorative film stretches following the irregular contour of the exposed surface, thus forming a closely bonded covering on the surface. During this time, the decorative film 13 surrounds not only the sides but also the back side 18 of the base 1, thus completely covering the exposure surface without forming wrinkles.

Next, the upper and lower vacuum chambers 12,11 are reopened and restored to atmospheric pressure, and the adherend 14, 15 covered with the decorative film 13 is removed out. As shown in FIG. 2E, the edges of the decorative film 13 bonded to the surface of the adherend 14, 15 are trimmed to complete the vacuum contact bonding step. The heated vacuum contact bonding step using the vacuum contact bonding machine is not limited to the one described above and may of course incorporate various modifications, while the heating and pressure conditions may also be modified.

Since a vacuum contact bonding process is used for wrapping of the decorative film in the process for production of a wrapped shaped article according to the present disclosure, it is possible to provide coverings with high adhesiveness and contour following properties not only for flat adherends, but also for adherends having irregularities on the surface, including bases as three-dimensional shaped articles. As a result, it is possible to impart to the base a three-dimensional decoration having a high aesthetic quality that reflects the irregularities formed in the base surface by the three-dimensional members. Moreover, since selection and positioning of the three-dimensional members can be varied, design variation can be effected without producing a molding die. When vacuum contact bonding is employed, the entire adherend surface can be wrapped with the decorative film, thus providing a satisfactory decorative property, while also increasing the protective effect for the base and improving weather resistance.

Uses of the wrapped three-dimensional shaped article of the present disclosure are not particularly restricted and suitably include uses as exterior and interior parts of automobiles, airplanes, ships and motorcycles, for which decorative properties are desired. It is particularly suitable for exterior and interior parts of automobiles and motorcycles that use high weather resistance and decorative properties, including motorcycle shrouds, side cowls and four-wheeled, all terrain vehicle front cowls, for example.

The wrapped shaped article according to the present disclosure can be suitably used as an interior or exterior part of an automobile or motorcycle, and the following is an example of the performance demanded for decorative films of wrapped three-dimensional shaped articles which are to be used as interior or exterior parts of automobiles or motorcycles. (The test methods "1. Pressure-Sensitive Adhesive Force Test" and "2. Outer Appearance test" were used to evaluate the samples in the following examples.)

1. Pressure-Sensitive Adhesive Force Test

After the following tests using a 100% size (non-stretched) film (control) and a 200% size stretched film (stretched to 2× size):

Hot water immersion test: 40° C.×24 hours
Heat aging test: 80° C.×96 hours
High temperature/high humidity aging test: 50° C., 95% RH×120 hours
Heat cycle test: 5 cycles of −40° C., 2 hours and 50° C., 2 hours
5% Salt spray test: 120 hours spraying of film edges with 5 wt % brine, The film was stretched using a vacuum forming machine (obtained from Fuse Vacuum Co., Habikino, Osaka, Japan) using the conditions specified for Examples 1-11.

Tested films that:
had no notable difference in outer appearance after the tests compared to another sample which was allowed to stand at room temperature (i.e., 23° C.) at 50% humidity for 48 hours, and
had a post-test adhesive force of at least 11.8 N/25 mm (180 degree peel test) (according to JIS-Z-0237)
were deemed to have passed the test.

2. Outer Appearance Test

After the following tests using a 100% size (non-stretched) film and a 200% size stretched film (stretched to 2× size):

Sunshine weather (JIS D 0205 WAN-1S) test: 400 hours
Sunshine weather (WOM) test: 1000 hours
Outdoor exposure test (JIS D 0205): 1000 hours at a 45 degree angle from the horizontal plane and a height of 12 m
Car wash durability test: Conducted toward the edges of the film for 1 minute at a 45 degree angle, with pressurized water at 80° C., 5.8 MPa at a distance of 0.3 m, Tested films that had no notable differences in outer appearance after the tests compared to another sample allowed to stand at room temperature (i.e., 23° C.) at 50% humidity for 48 hours were deemed to have passed the test.

In the wrapped three-dimensional shaped article according to the present disclosure, the three-dimensional decoration is applied to the base by three-dimensional members, but a surface-wrapped decorative film can also satisfy the conditions specified above.

The bases, three-dimensional members and decorative films used in the examples of the present invention will now be described in detail.

The bases and three-dimensional members used in the examples were standard industrial grade materials.

Bases
Melamine-coated iron sheet, 150 mm length×70 mm width×0.5 mm thickness
Polypropylene (PP) sheet, 150 mm length×70 mm width×2 mm thickness Three-Dimensional Members For Examples 1-11, resin films having the materials and thicknesses shown in Table 1 were used as bases, and pressure-sensitive adhesive tapes with an acrylic adhesive layer having the thicknesses shown in Table 1 were used as the three-dimensional members. For Comparative Examples 1-2, resin films having the materials and thicknesses shown in Table 2 were used without pressure-sensitive adhesives.

The following abbreviations are used in Tables 1 and 2.
PP: Polypropylene
PE: Polyethylene
PVC: Polyvinyl chloride
PUR: Polyurethane
PMMA: Polymethyl methacrylate
PC: Polycarbonate
ABS: Acrylonitrile/butadiene/styrene Decorative Films The following two types of decorative films were used.
PVC surface film (available under the trade designation "GHA3100 J" from Sumitomo-3M)
PUR surface film (available under the trade designation "GHA4100 J" from Sumitomo-3M)

These two decorative films satisfy the following specifications.

Outer appearance: No visually apparent wrinkles, film tearing, dirt adhesion or fouling.
Thickness: 0.09 mm-0.11 mm
Color: No significant difference from standard sample.
Elongation: ≥80% of original dimensions
Heated elongation: At least 200% elongation of the original dimensions, measured 30 seconds after the atmospheric temperature in a high temperature oven at 135° C.
Tensile strength: At least 20 N (measured according to JIS-Z-0237 using an instrument obtained under the trade designation "TENSILON" from Orientec Inc. Tokyo, Japan) with a 25 mm-width sample.
Printing property: No high wettability black ureathane ink and a transparent acrylic transparent film and no peeling from film.

The pressure-sensitive adhesive layer of the decorative film used for the melamine-coated iron sheet was an ordinary acrylic pressure-sensitive adhesive (2-ethylhexyl acrylate/acrylic acid), while for the PP pressure-sensitive adhesive there was used an ordinary pressure-sensitive adhesive (butyl acrylate/acrylic acid) with addition of a rosen tackifier (obtained under the trade designation "SK DAN 1502FS" from Soken Chemical & Engineering Co., Ltd. Tokyo, Japan) to create sticky feel.

EXAMPLES 1-11

Figure 3A:
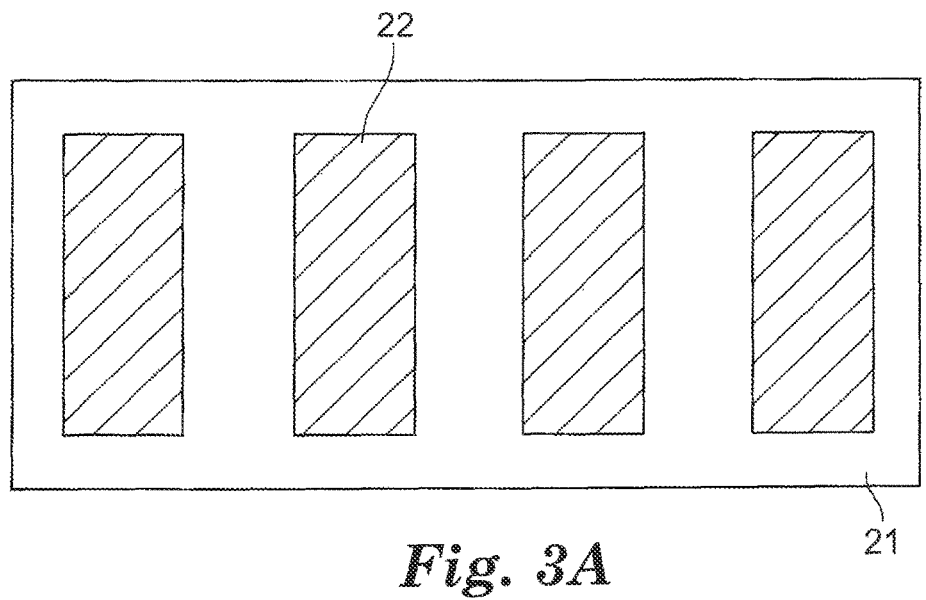
FIGS. 3A-3C show the configuration of the samples used in Examples 1-11.
Figure 3B:
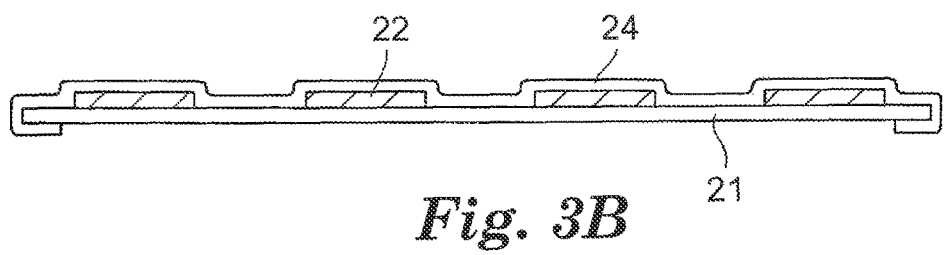
Figure 3C:
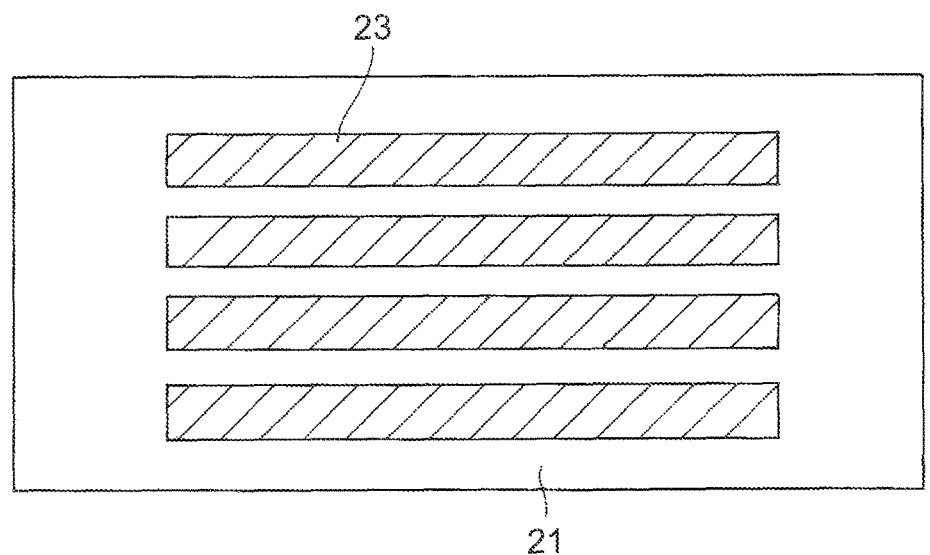

The four pressure-sensitive adhesive tapes shown in Table 1 were cut to dimensions of 20×50 mm (22 in FIGS. 3A and 3B, for thicknesses of up to 0.5 mm) or 10×100 mm (23 in FIG. 3C, for thicknesses exceeding 0.5 mm), to prepare three-dimensional members. The three-dimensional members were attached in parallel formation at roughly equal spacings, as shown in FIGS. 3A-C, on the surface of a 70×150 mm base 21 consisting of a melamine-coated iron sheet or PP sheet. The bases with four pressure-sensitive adhesive tapes bonded thereto were each considered a unit.

The angles formed between the sides of the three-dimensional members and the sides of the three-dimensional members in contact with the bases were approximately 90 degrees.

"Slipping" was judged as "A" (good) if the three-dimensional members slipped no more than 0.1 mm before and after attachment of the decorative film, or "B" (poor) if the three-dimensional members slipped more than 0.1 mm.

When these samples were evaluated by the "1. Pressure-sensitive adhesive force test" and "2. Outer appearance test" as tests for interior and exterior parts of automobiles or motorcycles, satisfactory results were obtained for properties.

TABLE 1

| | three-dimensional member | | first pressure-sensitive adhesive | | melamine-coated iron sheet | | | polypropylene (PP) sheet | | |
|---|---|---|---|---|---|---|---|---|---|---|
| | material | thickness | category | thickness | surface property | edge raising | slipping | surface property | edge raising | slipping |
| Ex. 1 | PVC | 0.05 mm | Acrylic | 0.03 mm | A | A | A | A | A | A |
| Ex. 2 | PVC | 0.1 mm | Acrylic | 0.03 mm | A | A | A | A | A | A |
| Ex. 3 | PVC | 0.15 mm | Acrylic | | A | A | A | A | A | A |
| Ex. 4 | PUR | 0.03 mm | Acrylic | 0.03 mm | A | A | A | A | A | A |
| Ex. 5 | PUR | 0.06 mm | Acrylic | | A | A | A | A | A | A |
| Ex. 6 | PET | 0.05 mm | Acrylic | 0.03 mm | A | A | A | A | A | A |
| Ex. 7 | PET | 0.1 mm | Acrylic | | A | A | A | A | A | A |
| Ex. 8 | PP | 0.1 mm | Acrylic | 0.03 mm | A | A | A | A | A | A |
| Ex. 9 | PP | 0.1 mm | Acrylic | 0.03 mm | A | A | A | A | A | A |
| Ex. 10 | PVC | 0.13 mm | acrylic | 0.06 mm | A | A | A | A | A | A |
| Ex. 11 | PVC | 0.15 mm | acrylic | 0.09 mm | A | A | A | A | A | A |

Each of eight pressure-sensitive adhesive tape-attached base units was set on the approximately 500 mm×600 mm attachment platform of a vacuum contact bonding machine (vacuum forming machine obtained from Fuse Vacuum Forming Co., Ltd., Habikino, Osaka, Japan), and a 100 micrometer-thick PVC film ("GHA3100 J") adjusted to the thicknesses shown in Table 1 was used as a decorative film 24 for contact bonding onto the surfaces of the eight base 21 units by heated vacuum contact bonding by the procedure explained above based on FIGS. 2A-E, with a temperature of 120° C., a vacuum pressure of 1 kPa and a shaping pressure of atmospheric pressure. Each of the units was then cooled to room temperature and trimmed at the edges to produce fully wrapped shaped article samples (see FIG. 3B).

After standing for 24 hours, each sample was visually evaluated for surface property, edge raising and slipping.

The "surface property" was judged as "A" (good) if no inconveniences such as trapped air or wrinkles were present, or "B" (poor) if such inconveniences were present.

"Edge raising" was judged as "A" (good) if no inconveniences such as raising of the decorative film at the periphery of the three-dimensional members were present, or "B" (poor) if such inconveniences were present.

COMPARATIVE EXAMPLES 1 and 2

Each of the resin films shown in Table 2 (below), which were not coated with a pressure-sensitive adhesive, were used instead of pressure-sensitive adhesive tapes as the three-dimensional members (22 or 23), and were simply set on the surface of the base 21 and vacuum contact bonded with a vacuum contact bonding machine in the same manner as for Examples 1-11.

The obtained samples were evaluated by the same methods as described for Examples 1-11. The results are shown in Table 2, below.

TABLE 2

| | three-dimensional member | | | first pressure-sensitive adhesive | | | melamine-coated iron sheet | | | polypropylene (PP) sheet | | |
|---|---|---|---|---|---|---|---|---|---|---|---|---|
| | material | product No. | thickness | pressure-sensitive adhesive | product No. | thickness | surface property | edge raising | slipping | surface property | edge raising | slipping |
| Comparative Example 1 | PVC | | 0.05 mm | none | — | — | A | A | B | A | A | B |
| Comparative Example 2 | ABS | | 2.0 mm | none | — | — | A | B | B | A | B | B |

A good
B poor

EXAMPLE 12

Figure 4A:
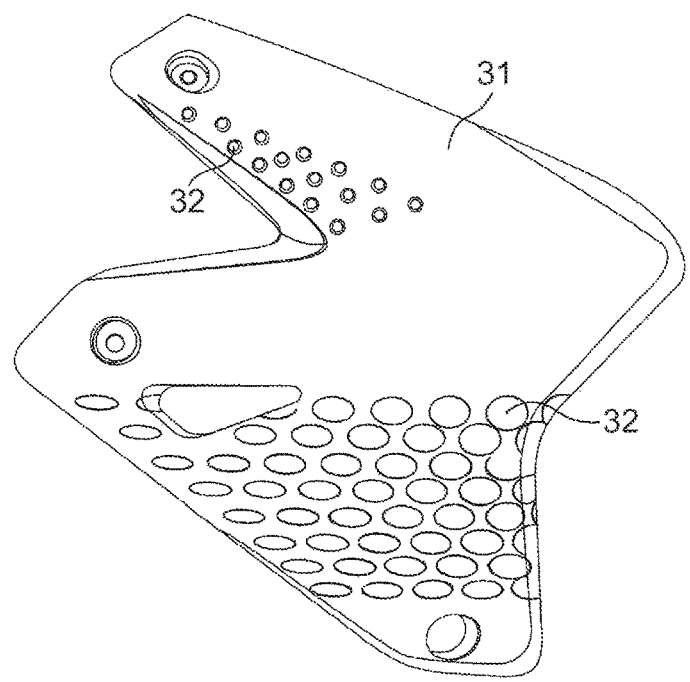
FIGS. 4A and 4B show a drawing and photograph, respectively, of a three-dimensional shaped article as a motorcycle shroud for Example 12.
Figure 4B:
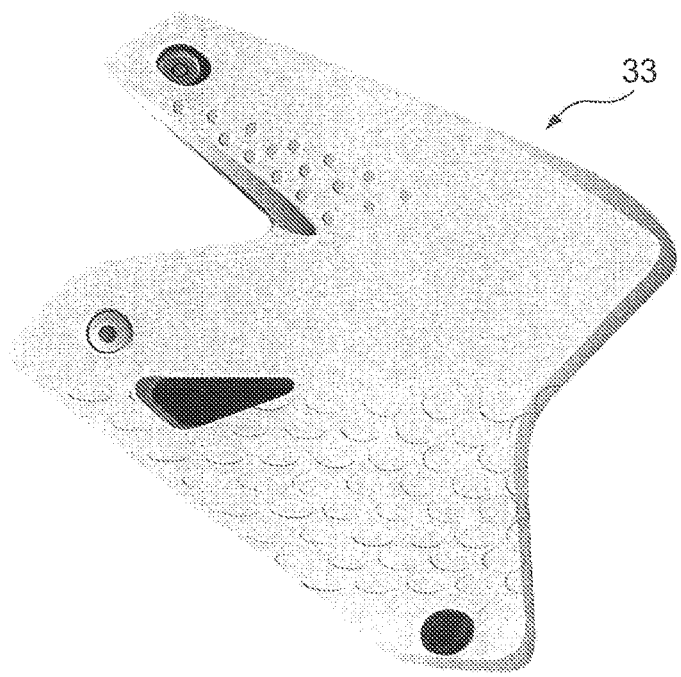

Using a PP motorcycle shroud 31 molded into the shape shown in FIGS. 4A and 4B as the base and using three-dimensional members 32 obtained by punching out a 100 micrometer-thick PUR sheet with a Thompson blade to form 5 mm diameter, 1.5 mm-high pieces and filling the hollow sections with nylon, a plurality of the three-dimensional members 32 were placed on the main surface of the motorcycle shroud 31 as shown in FIG. 4A and adhered thereto, and this unit was set on the attachment platform of a vacuum contact bonding machine, after which PVC surface film ("GHA3100 J") and PUR surface film ("GHP4000 J") was used as the decorative film for contact bonding by vacuum contact bonding under conditions with a temperature of 120° C., a vacuum pressure of 1 kPa and a shaping pressure of atmospheric pressure. The bonded unit was then cooled to room temperature and trimmed at the edges to produce a motorcycle shroud 33 sample as a fully wrapped three-dimensional shaped article.

Figure 5A:
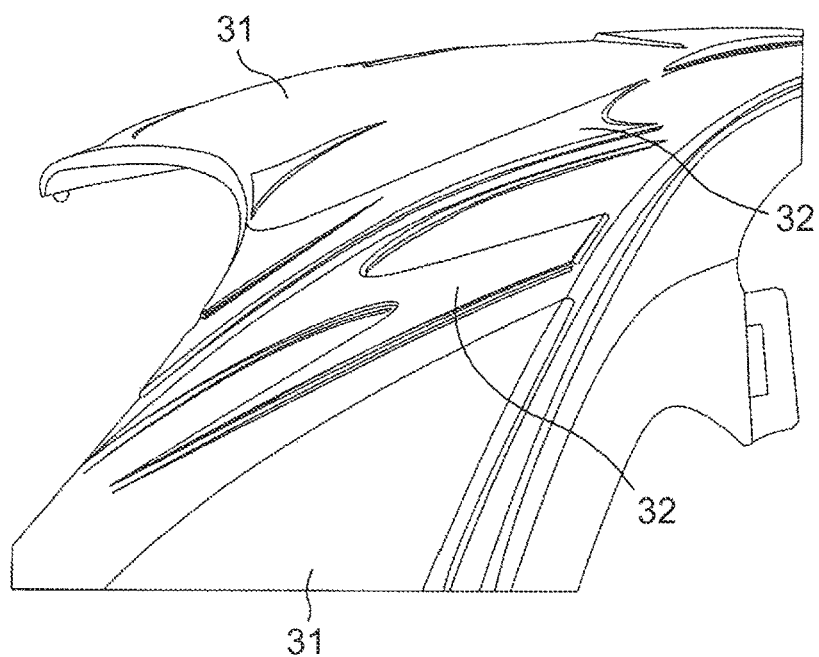
FIGS. 5A and 5B show a drawing and photograph, respectively, of a three-dimensional shaped article as a motorcycle shroud for Example 13.
Figure 5B:
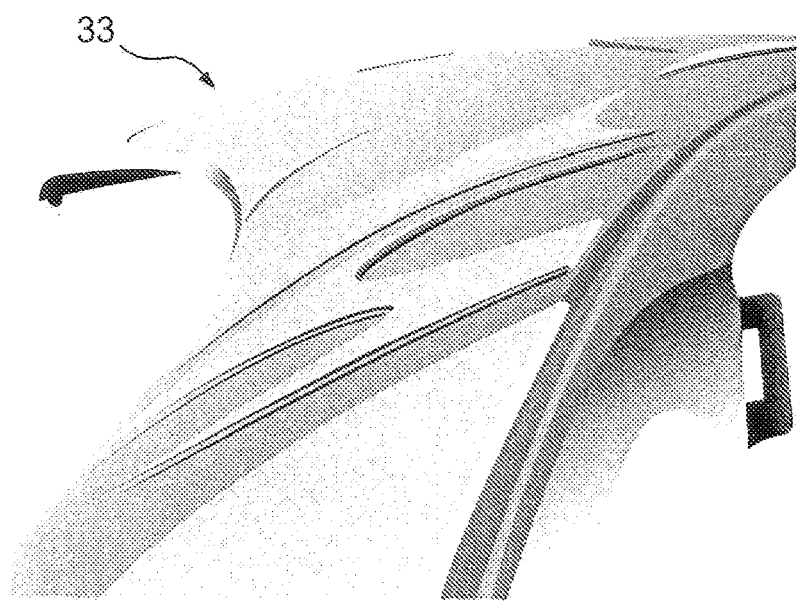

A photograph of the obtained motorcycle shroud with PVC film is shown in FIG. 4B. FIGS. 5A and 5B shows a magnified view a section of a three-dimensional decoration (irregular patterns) on another portion of the motorcycle shroud 41, 43 with three-dimensional members 42.

The motorcycle shroud was judged as "A" (good) in the evaluation of the surface property, edge raising and slipping, and also exhibited satisfactory results for all properties in the "1. Pressure-sensitive adhesive force test" and "2. Outer appearance test" described above.

EXAMPLE 13

Surface irregular patterns were created using 2.0 mm-thick PVC shaped articles as three-dimensional members on a PP motorcycle shroud, in the same manner as Example 12.

FIG. 5 shows a drawing (FIG. 5A) and photograph (FIG. 5B) of a side cowl as the fully wrapped three-dimensional shaped article.

The side cowl was judged as "A" (good) in the evaluation of the surface property, edge raising and slipping, and also exhibited satisfactory results for all properties in the "1. Pressure-sensitive adhesive force test" and "2. Outer appearance test" described above.

What is claimed is:

1. A wrapped three-dimensional shaped article comprising:
    a base having a first major surface, one or more edges, and a back side,
    a plurality of three-dimensional members partially bonded onto the first major surface of the base so as to impart a three-dimensional decoration of patterns onto the first major surface of the base, wherein each three-dimensional member has a height of 2 millimeters or greater; and
    a decorative film attached to cover an exposed surface of the base including the three-dimensional members, wherein the decorative film comprises a base film layer of thermoplastic resin backed by an adhesive, the thermoplastic resin having a glass transition temperature ranging from approximately 60° C. to approximately 140° C. and wherein each three-dimensional member comprises a pressure-sensitive adhesive layer shaped to form a respective pattern element, the three-dimensional member bonded to the first major surface of the base by the pressure-sensitive adhesive layer, whereby the adhesive contacts both the pressure sensitive adhesive layer and the exposed first major surface of the base to achieve an integrated effect between the base and three-dimensional members, and the decorative film.

2. The wrapped three-dimensional shaped article according to claim 1, wherein the decorative film is attached to the base by vacuum contact bonding.

3. The wrapped three-dimensional shaped article according to claim 1, wherein each three-dimensional member comprises a base film layer formed of at least one of polyvinyl chloride or polyurethane.

4. The wrapped three-dimensional shaped article according to claim 1, which is an exterior or interior part for at least one of an automobile or motorcycle.

5. The wrapped three-dimensional shaped article according to claim 4, which is a side cowl of a motorcycle or a center cowl of a four-wheeled, all terrain vehicle.

6. The wrapped three-dimensional shaped article according to claim 1, wherein the three-dimensional members are bonded to the first major surface to impart a decoration of irregular patterns on the first major surface of the base.

7. The wrapped three-dimensional shaped article according to claim 1, wherein each three-dimensional member comprises a base film layer backed by an adhesive.

8. The wrapped three-dimensional shaped article according to claim 6, wherein the decorative film comprises the base film layer backed by an adhesive.

9. The wrapped three-dimensional shaped article according to claim 7, wherein the decorative film comprises the base film layer backed by an adhesive.

10. The wrapped three-dimensional shaped article according to claim 1, wherein the base is an exterior or interior part of an automobile, airplane, ship, or motorcycle.

11. The wrapped three-dimensional shaped article according to claim 1, wherein the base, three-dimensional members, and the decorative film form integral parts of the wrapped three-dimensional shaped article such that the decorative film follows the surface of the three-dimensional members and the base.

12. The wrapped three-dimensional shaped article according to claim 1, wherein the decorative film is integrally bonded to the base by vacuum contact bonding.

13. The wrapped three-dimensional shaped article according to claim 1, wherein at least some of the edges of the base are covered up by the decorative film.

14. The wrapped three-dimensional shaped article according to claim 1, wherein the decorative film covers at least a portion of the back side of the base.

* * * * *

UNITED STATES PATENT AND TRADEMARK OFFICE
CERTIFICATE OF CORRECTION

PATENT NO. : 10,076,889 B2
APPLICATION NO. : 13/063578
DATED : September 18, 2018
INVENTOR(S) : Takeaki Sakamoto et al.

It is certified that error appears in the above-identified patent and that said Letters Patent is hereby corrected as shown below:

On the Title Page

<u>Item (54), Under (Title)</u>
Lines 2-3, after "ARTICLE" delete "AND PROCESS FOR ITS PRODUCTION".

In the Specification

<u>Column 1</u>
Lines 2-3, after "ARTICLE" delete "AND PROCESS FOR ITS PRODUCTION".

<u>Column 7</u>
Line 20, delete "inkjet" and insert -- ink-jet --, therefor.
Line 24, delete "inks" and insert -- inks. --, therefor.

<u>Column 12</u>
Line 57, delete "DAN" and insert -- DAIN --, therefor.

Signed and Sealed this
Twenty-seventh Day of November, 2018

Andrei Iancu
*Director of the United States Patent and Trademark Office*